Feb. 11, 1936.     C. F. LILES     2,030,598
PASTRY MAKING MACHINE
Filed Feb. 25, 1935
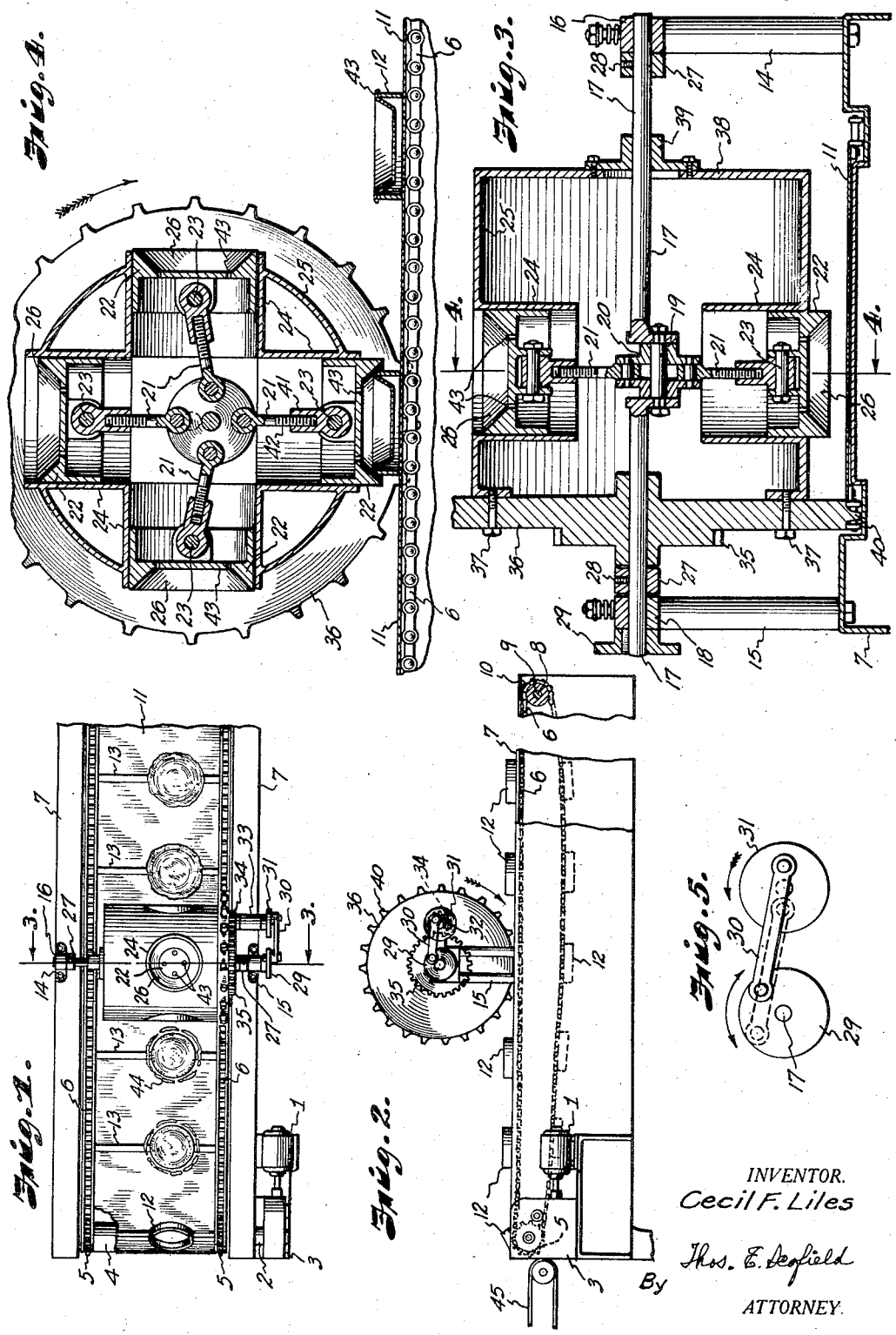
INVENTOR.
*Cecil F. Liles*
*Thos. E. Scofield*
By     ATTORNEY.

Patented Feb. 11, 1936

2,030,598

UNITED STATES PATENT OFFICE 2,030,598

PASTRY MAKING MACHINE

Cecil F. Liles, Independence, Mo.

Application February 25, 1935, Serial No. 8,006

3 Claims. (Cl. 107—15)

My invention relates to pastry making machines and more particularly to a machine for trimming pie crusts.

In large bakeries where many pies are made, pie crust is placed in a pie pan and the filling inserted. The upper crust is then placed over the filling, unless the pie is to be an open face pie. If the lower and upper crusts are large enough to more than cover the pie pan, these operations can be performed rapidly. After the pie has been thus assembled, it is necessary to cut the excess crust, that is, the crust which extends beyond the periphery of the pie pan, from the pie. This is called "trimming" the pie crust and this operation takes considerable time.

One object of my invention is to provide a device for automatically trimming pie crust from pies.

Another object of my invention is to provide a machine which will enable pie crust to be trimmed from pies in a rapid, convenient, and expeditious manner.

Other and further objects of my invention will appear from the following description.

In the accompanying drawing which forms part of the instant specification and is to be read in conjunction therewith and in which like reference numerals are used to indicate like parts in the various views:

Figure 1 is a plan view of an assembly showing one mode of carrying out my invention.

Figure 2 is an elevational view of the assembly shown in Figure 1.

Figure 3 is a sectional view taken on a line 3—3 of Figure 1.

Figure 4 is a sectional view taken on a line 4—4 of Figure 3.

Figure 5 is an enlarged view showing a detail of the trimmer piston driving mechanism.

In general, my invention contemplates the provision of a conveyor belt provided with a number of receivers into which the pie pans carrying the roughly assembled pies are placed. The conveyor belt is adapted to convey the pie under a trimming device which is operated in synchronized relationship to the belt travel so that, as the pie pan in the receiver moves underneath the trimming machine, it is automatically trimmed of the excess crust.

More particularly referring now to the drawing, a motor 1 which may be any suitable prime mover, drives shaft 2 through a transmission 3. Mounted on shaft 2 in any suitable manner is a roller 4. The roller may be secured to the shaft for rotation therewith or may be loosely mounted, if desired. Keyed to shaft 2 are sprocket wheels 5 adapted to actuate sprocket chains 6. The shaft 2 is mounted on a framework 7 which, at its other end, carries a roller 8 similar to roller 4 mounted on a shaft 9 carrying sprocket wheels 10 similar to sprocket wheels 5. The sprocket chains 6 are endless, being mounted on sprocket wheels 5 and 10. An endless belt 11 is mounted on rollers 8 and 4. Secured to belt 11 in any suitable manner are receivers 12, which are secured to sprocket chains 6 by braces 13. If desired, the belt 11 may be dispensed with and the conveyor be comprised merely of sprocket chains 6, braces 13 and receivers 12. At a suitable place along the framework 7 I mount standards 14 and 15. Standard 14 carries a bearing 16 in which one end of a shaft 17 is adapted to be journaled. Standard 15 carries a bearing 18 in which the other end of shaft 17 is adapted to be journaled. Shaft 17 is formed with a crank 19 on which is mounted a disk 20. To disk 20 are fulcrumed connecting rods 21 which are pivotally connected to pistons 22 by means of wrist pins 23. Pistons 22 are adapted to reciprocate in cylinders 24. There are four cylinders 24 formed in a cylindrical body member 25 as can readily be seen by reference to Figure 4. The upper ends of pistons 22 are formed with conical bores 26 as can readily be seen by reference to Figures 3 and 4. Collars 27 secured by set screws 28 position shaft 17 on standards 14 and 15. To one end of shaft 17 is keyed a disk 29 to which is pivoted near its outer periphery a link 30, the other end of which is pivoted to a disk 31 which is keyed to a shaft 32 mounted in a bearing 33 carried by standard 15. To the other end of shaft 32 is keyed a gear 34 which meshes with a gear 35. Gear 35 may be formed integral with sprocket wheel 36 which is adapted to be driven from sprocket chain 6. The gear ratio between gears 34 and 35 is four to one so that, for each revolution of gear 35, gear 34 will make four revolutions. The body member 25 containing the cylinders 24 is bolted to the face of sprocket disk 36 by means of bolts 37. The opposite face 38 of body member 25 carries a suitable bearing 39 which is secured thereto in a suitble manner. The assembly which is formed by body member 25 and sprocket disk 36 is loosely mounted on shaft 17. Sprocket disk 36 is provided with sprocket teeth 40 which engage sprocket chains 6. It will be understood, of course, that, if desired, another sprocket wheel may be provided adjacent face 38 of the body member 25.

When the motor 1 is set in operation, the shaft 2 is rotated through the transmission 3. The sprocket gears 5 rotate and drive sprocket chains 6 together with the assembly of braces 13 and receivers 12 and the belt 11 if it is fitted. The movement of sprocket chains 6 rotates sprocket disk 36 through sprocket teeth 40. The rotation of sprocket disk 36 will also effect a rotation of gear 35 which is formed on the face of sprocket teeth 36 or, if desired, can be made separately and secured thereto. Gear 35 will drive gear 34 which will rotate shaft 32 and disk 31 which is keyed thereto. The rotation of disk 31 will impart to disk 29 an oscillating movement which will in turn oscillate shaft 17. The timing is such that, when one of the cylinders 24 is in a vertical position and adjacent to the conveyor, the piston 22 will be extended to its greatest throw. Connecting rods 21 are secured to wrist pins 23 by means of an internally threaded member 41. It will be noted that the outer ends of connecting rods 21 are threaded at 42. This threaded connection enables the throw of pistons 22 to be adjusted. The inner walls of pistons 22 are provided with vents 43 to permit the escape of air during the trimming operation.

In operation, pie pans 43 are placed by hand in receivers 12. The pie pans contain pies roughly assembled with the crusts extending beyond the periphery of the pie pans. As the conveyor moves to the left as viewed in Figure 1, the pie pans containing the roughly assembled pies will move in succession directly underneath the axis of shaft 17. It will be noted that the travel of the pistons 22 is in simple harmonic motion. As the pie moves underneath the trimming mechanism, a gentle contact is first made due to the fact that the initial movement of the pistons 22 is slow. This contact serves to seal the upper and lower crusts. As the movement of the pie continues, the trimming piston 22 moves to its maximum throw, which is so adjusted as to trim the excess crusts from the pies. The excess crusts 44 fall upon the conveyor belt 11 and, as the trimmed pies move toward roller 4, the receivers 12 will tilt as they round the roller 4. This action ejects the completed pies by gravity upon an adjacent conveyor belt 45 which carries the pies adjacent the oven in which they are to be baked.

It will be seen that I have accomplished the objects of my invention. I have provided a means for rapidly and efficiently trimming the crusts from pies, automatically. The device may be operated at high speeds and in practice I have trimmed over a hundred pies per minute, while operating my assembly at comparatively low speeds. By means of my assembly a large bakery will be enabled to increase its pie output materially. Because my device seals the upper and lower crusts in a uniform and efficient manner, the seepage of the fruit juices is precluded. The seepage of fruit juices is a source of annoyance. Not only is a pie whose juices have seeped, inferior in that it is drier and not as attractive in appearance, but the juices which have escaped, caramelize and form carbon depositions in the oven, which are apt to give the pies a burned flavor and necessitate frequent cleaning.

It will be understood that certain features and sub-combinations are of utility and may be employed without reference to other features and sub-combinations. This is contemplated by and is within the scope of my claims. It is further obvious that various changes may be made in details within the scope of my claims without departing from the spirit of my invention. It is, therefore, to be understood that my invention is not to be limited to the specific details shown and described.

Having thus described my invention, what I claim is:

1. A pie trimming apparatus including in combination a conveyor, receivers mounted on said conveyor adapted to receive pies, a cylinder rotatably mounted adjacent said conveyor, a piston mounted for reciprocation in said cylinder, means for reciprocating said piston in phase relation to the motion of said conveyor, and pie trimming means carried by said piston.

2. In a pie crust trimming apparatus having a conveyor, receivers on said conveyor adapted to hold pies, a crust trimming device mounted adjacent said conveyor and adapted to be rotated thereby, a plurality of reciprocating cutters mounted in said device and means for reciprocating said cutters upon rotation of said device.

3. In a pie crust trimming device a rotatable cylinder provided with a plurality of bores, a plurality of crust trimming cutters mounted for reciprocation in said respective bores, means for rotating said device and means for reciprocating said cutters.

CECIL F. LILES.